United States Patent
Berger et al.

(10) Patent No.: US 7,593,969 B2
(45) Date of Patent: Sep. 22, 2009

(54) LINKED DIMENSION AND MEASURE GROUPS

(75) Inventors: Alexander Berger, Sammamish, WA (US); Thulusalamatom Krishnamurthi Anand, Redmond, WA (US); Edward Melomed, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 365 days.

(21) Appl. No.: 10/750,205

(22) Filed: Dec. 31, 2003

(65) Prior Publication Data

US 2005/0149550 A1 Jul. 7, 2005

(51) Int. Cl.
*G06F 17/30* (2006.01)
(52) U.S. Cl. .......................... 707/201; 707/10; 707/200
(58) Field of Classification Search .................. 707/102
See application file for complete search history.

(56) References Cited

U.S. PATENT DOCUMENTS

| | | | | |
|---|---|---|---|---|
| 5,918,232 | A * | 6/1999 | Pouschine et al. | 707/103 R |
| 6,327,574 | B1 * | 12/2001 | Kramer et al. | 705/14 |
| 6,389,427 | B1 * | 5/2002 | Faulkner | 707/104.1 |
| 6,442,554 | B1 * | 8/2002 | Reddy et al. | 707/100 |
| 6,477,536 | B1 * | 11/2002 | Pasumansky et al. | 707/102 |
| 6,581,068 | B1 * | 6/2003 | Bensoussan et al. | 707/104.1 |
| 6,785,689 | B1 * | 8/2004 | Daniel et al. | 707/102 |
| 6,820,135 | B1 * | 11/2004 | Dingman et al. | 709/246 |
| 6,980,963 | B1 * | 12/2005 | Hanzek | 705/26 |
| 2001/0037228 | A1 * | 11/2001 | Ito et al. | 705/7 |
| 2002/0040401 | A1 * | 4/2002 | Yasushi et al. | 709/229 |
| 2002/0152229 | A1 * | 10/2002 | Peng | 707/203 |
| 2005/0076036 | A1 * | 4/2005 | Le | 707/100 |
| 2005/0108271 | A1 * | 5/2005 | Hurmiz et al. | 707/102 |
| 2006/0294098 | A1 * | 12/2006 | Thomson et al. | 707/6 |
| 2007/0094316 | A1 * | 4/2007 | Rodriguez et al. | 707/205 |

OTHER PUBLICATIONS

Espil, M.M. et al., "Efficient Intensional Redefinition of Aggregation Hierarchies in Multidimensional Dayabases", *DOLAP*, Nov. 9, 2001, 8 pages.
Harinarayan, V. et al., "Implementing Data Cubes Efficiently", *SIGMOD*, 1996, 205-216.
Hurtado, C.A. et al., "Updating OLAP Dimensions", *DOLAP*, 1999, 60-66.
Niemi, T. et al., "Constructing OLAP Cubes Based on Queries", *DOLAP*, Nov. 9, 2001, 9-15.
Pourabbas, E. et al., "Characterization of Hierarchies and Some Operators in OLAP Environment", *DOLAP*, 1999, 54-59.
Feng, Jian-hua, et al., "An Improved Multi-Dimensional Storage Structure for Data Warehousing", *Journal of Software*, 2002, 13(8), 1423-1429 (English Language Abstract is attached to the last page (1429)).
Colossi, N. et al., "Relational Extensions for OLAP", *IBM Systems Journal*, 2002, 41(4), 714-731.

(Continued)

*Primary Examiner*—Don Wong
*Assistant Examiner*—Angela M Lie
(74) *Attorney, Agent, or Firm*—Woodcock Washburn LLP

(57) ABSTRACT

The ability to link dimensions and measure groups in one analysis database to a second database is provided. This feature enables the use of the dimension or measure group without physically creating and managing the contents of the cube so defined.

16 Claims, 4 Drawing Sheets

OTHER PUBLICATIONS

Huan-liang, S. et al., "Multi-dimensional Data Model of Data Warehouse Based on XML Technology", *Mini-Micro Systems*, 2002, 23(11), 1306-1309 (English Language Abstracts provided).

Wang, L. et al., "Cardinality-Based Inference Control in Sum-Only Data Cubes", *Computer Security-ESCORICS-7th European Symposium on Research in Computer Security Proceedings(Lecture Notes in Computer Science)*, 2002, 55-71.

Wang, X.L. et al., "XML-Based Data Cube", *International Conferences on Info-Tech and Info-Net Proceedings*, 2001, 5, 48-53.

Wang, Xiaoling, et al., "XML Based Data Cube and X-OLAP", *Journal of Southeast University (English Edition)*, 2001, 17(2), 5-9.

* cited by examiner

LINKED DIMENSION AND MEASURE GROUPS

FIELD OF THE INVENTION

The present invention pertains generally to computer-implemented databases, and more specifically to linking dimensions and measure group objects from one analysis server database to another.

BACKGROUND OF THE INVENTION

Typical relational database management system (RDBMS) products are limited in their ability to provide users with specific views of analyzed data. Thus, several categories of database software have been developed to provide an interface to enable users to transform or limit raw data according to user-defined or pre-defined functions, and quickly and interactively examine the results. One type of software developed for this purpose is called data mining. Another is on-line analytical processing or OLAP, which typically involves aggregating, summarizing, consolidating, summing, and analyzing data retrieved from databases from different points-of-view to find patterns, trends and exceptions. The databases on which data mining and OLAP operate are often referred to as data warehouses.

For example, a user can request that data be analyzed to display a spreadsheet showing all of a company's widget products sold in Pennsylvania in the month of November, compare revenue figures with those for the same products in September, and then see a comparison of widget product sales in Washington for the same time period.

Data mining and OLAP tools are based on a multidimensional data model. The OLAP model, for instance, views data in the form of a data cube. Whereas a relational database can be thought of as two-dimensional, a multi-dimensional database considers each data attribute (such as product, geographic sales region and time period) as a separate dimension. Although a cube is usually thought of as a three-dimensional geometric structure, in OLAP terminology, a cube is n-dimensional. A cube thus allows data to be modeled and viewed in multiple dimensions, as defined by dimensions and measures.

A dimension is a perspective by which an organization wants to keep records. A retail company, for example, may want to create a sales data warehouse to keep records of the store's sales with respect to the dimensions time, item, branch and location. These dimensions allow the store to keep track of attributes like monthly sales of items and the branches and locations at which the items were sold. A time dimension might consist of days, weeks, months, and years, while a location dimension might consist of cities, states and countries. Dimension members act as indices for identifying a particular cell or range of cells within a multi-dimensional array.

A multi-dimensional data model is typically organized around a central theme, like sales, for instance. The theme is represented by measures, or quantities by which relationships between dimensions can be analyzed. Examples of measures for a sales data warehouse might include sales amounts in dollars, and numbers of units sold. Measures that are organized according to a particular attribute may belong to a measure group. For example, customer, product and sales amounts in dollars may belong to a sales measure group.

U.S. Pat. No. 6,477,536 entitled "Virtual Cubes" issued Nov. 5, 2002 describes systems and methods for creating and maintaining a virtual cube. A virtual cube is a combination of multiple cubes in one logical cube. Measures and dimensions from the complete set of dimensions and measures of the component physical cubes are selected as dimensions for a logical virtual cube which users may perceive as a single cube. U.S. patent application Ser. No. 10/606,343 entitled "System and Method for Analytically Modeling Data from Different Measure Groups onto a Single Cube" filed Jun. 25, 2003 describes modeling data from different measure groups onto a single cube.

Typically in an organization, users create a database wherein the data is organized into one or more cubes, each cube defined by dimensions and measures, with measure data organized into measure groups, for the purpose of processing the data in ways meaningful to the organization. A number of different departments in the organization may want to use the same data, typically requiring the creation of a copy of the data to be placed on another computer. Once more than one copy of the data exists, problems arise with keeping all the copies updated. It would be helpful if there were a way to allow data to be shared (distributed) while minimizing the problems associated with having multiple copies.

SUMMARY OF THE INVENTION

The ability to link dimensions and measure groups in one analysis database to a second database is provided. This feature enables the use of the dimension or measure group without physically creating and managing the contents of the cube so defined. The source database may specify certain dimensions inaccessible. In addition to addressing the problems of data distribution, linked dimensions and measure groups may also be used to address issues of scalability.

A dimension or measure group object may be marked as "linked". The linked dimension and/or measure group object is associated with a data source that points to an analysis server and database in which the source dimension and measure group is located. Any subset of measures of any measure group of the source database (cube) and any subset of dimensions of the source database (cube) can be selected for linking. After linking, dimensions and/or measure groups appear to the user as regular objects, enabling the user to query metadata and data for these objects. The linked dimension and/or measure group object may have one or more of the following properties: LinkPersistence, RefreshPolicy, RefreshInterval and Filter.

When the linked object is created and processed, a connection to the source server is established and the metadata from the source object is retrieved. Subsequently when a client issues a query to the linked object, the request is forwarded to the source object and a response is returned to the client. The response results may be cached in memory so that subsequent identical requests do not have to be requested from the source (potentially remote) object. In some embodiments, the cache is managed using a least recently used (LRU) scheme, although other schemes such as but not limited to a scheme based on least time to build, or a scheme based on most memory usage, etc. may be used.

When the metadata or data on the source object changes, the linked object may detect the change and refresh its cache. In some embodiments of the invention, changes are detected in accordance with a RefreshPolicy property of the object. Contemplated RefreshPolicies include ByQuery, in which the data is refreshed with every query to the linked object, or ByInterval in which data is refreshed after a specified interval (e.g., hourly, daily, weekly, monthly, etc.). The interval in some embodiments is specified via a property RefreshInterval.

A LinkPersistence property may control how changes to the linked object are handled. If the LinkPersistence property is specified as "metadata", then the metadata of the object is retrieved and persisted. The metadata is not allowed to change until the next time the object is processed or altered. If the LinkPersistence property is specified as "data" or "fully persisted", then the metadata and data of the object are retrieved and persisted. If the LinkPersistence property is specified as "not persisted", then neither metadata nor data is persisted. The object is fully dynamic and any change made to the source object is propagated to the linked object.

A Filter property may be specified to restrict the contents of the linked object. For example, a department might link to a central products dimension but limit the products accessed to products of a certain type.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Figure 1:
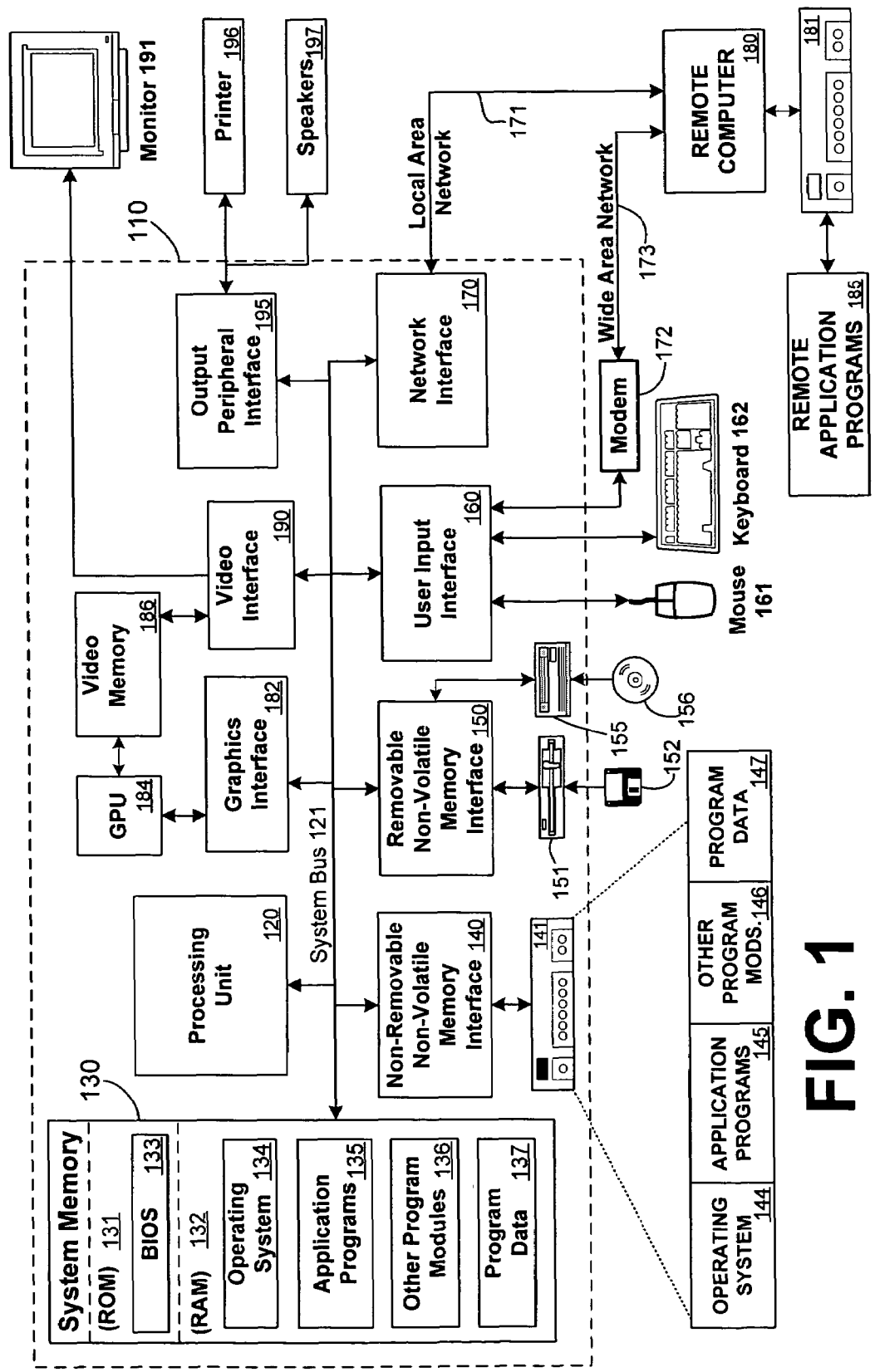
FIG. 1 is a block diagram showing an exemplary computing environment in which aspects of the invention may be implemented.

The ability to link dimensions and measure groups in one analysis database to a second database is provided. This feature enables the use of the dimension or measure group without physically creating and managing the contents of the cube so defined. The source database may specify certain dimensions inaccessible. In addition to addressing the problems of data distribution, linked dimensions and measure groups may also be used to address issues of scalability. If a particular machine is not- capable of handling enough users, the analysis tasks could be spread across several machines using linked dimensions and measure groups.

A dimension or measure group object may be marked as "linked". The linked dimension and/or measure group object is associated with a data source that points to an analysis server and database in which the source dimension and measure group is located. Any subset of measures of any measure group of the source cube and any subset of dimensions of the source cube can be selected for linking. For example, if a source measure group A includes measure 1, measure 2 and measure 3, linked measure group A may include only measure 1 and measure 3. After linking, dimensions and/or measure groups appear to the user as regular objects, enabling the user to query metadata and data for these objects. The linked dimension and/or measure group object may have one or more of the following properties: LinkPersistence, RefreshPolicy, RefreshInterval and Filter.

For example, a company may maintain and publish a products dimension on a central analysis server. A department such as a sales department, for instance, may then create linked dimensions pointing to the central products dimension. The linked dimensions can then be used in one or more cubes to perform analysis specific to the sales department. For example, the sales department might create a cube that analyzes the sales of various products. A manufacturing department might create a cube that analyzes the product inventory. Managers might want to correlate sales and inventory and so might create a cube with two linked measure groups, one measure group linking to the sales cube and another measure group linking to the inventory cube.

When the linked object is created and processed, a connection to the source server is established and the metadata from the source object is retrieved. Subsequently when a client issues a query to the linked object, the request is forwarded to the source object and a response is returned to the client. The response results may be cached in memory so that subsequent identical requests do not have to be requested from the source (potentially remote) object. In some embodiments, the cache is managed using a least recently used (LRU) scheme, although other schemes such as but not limited to a scheme based on least time to build, or a scheme based on most memory usage, etc. may be used.

When the metadata or data on the source object changes, the linked object may detect the change and refresh its cache. In some embodiments of the invention, changes are detected in accordance with a RefreshPolicy property of the object. Contemplated RefreshPolicies include ByQuery, in which the data is refreshed with every query to the linked object, or ByInterval in which data is refreshed after a specified interval (e.g., hourly, daily, weekly, monthly, etc.). The interval in some embodiments is specified via a property RefreshInterval.

A LinkPersistence property may control how changes to the linked object are handled. If the LinkPersistence property is specified as "metadata", then the metadata of the object is retrieved and persisted. The metadata is not allowed to change until the next time the object is processed or altered. If the LinkPersistence property is specified as "data" or "fully persisted", then the metadata and data of the object are retrieved and persisted. If the LinkPersistence property is specified as "not persisted", then neither metadata nor data is persisted. The object is fully dynamic and any change made to the source object (database A) is propagated to the linked object (database B).

A Filter property may be specified to restrict the contents of the linked object. For example, a department might link to a central products dimension but limit the products accessed to products of a certain type.

In addition to being useful for the purpose of distribution of data, the invention may also be utilized for the purpose of scalability. For example, if a particular machine on which a database exists is not capable of handling enough users, the processing tasks could be spread across several machines by using linked dimensions and measure groups, without creating an additional copy of the data.

Overview of a Suitable Computing System Environment

FIG. 1 illustrates an example of a suitable computing system environment 100 in which a system and method for OLAP using linked dimensions and measure groups may be implemented. The computing system environment 100 is only one example of a suitable computing environment and is not intended to suggest any limitation as to the scope of use or functionality of the method and system for accessing data in a relational or OLAP database. Neither should the computing environment 100 be interpreted as having any dependency or requirement relating to any one or combination of components illustrated in the exemplary operating environment 100.

The systems and methods of the invention described are operational with numerous other general purpose or special purpose computing system environments or configurations. Examples of well known computing systems, environments, and/or configurations that may be suitable for use with the method and system for accessing data in a relational database include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. It is to be understood that combinations of any of the media are also included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, are typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM, CDRW, or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, the MICROSOFT® .NET platform includes servers, building-block services, such as web-based data storage, and downloadable device software. Generally speaking, the NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the systems and methods of the invention may also be implemented via an operating system, application program interface (API), or a "middle man" object between a coprocessor and requesting object, such that services may be performed by, supported in, or accessed via all of .NET's languages and services, and in other distributed computing frameworks as well.

System and Method for Linking Dimensions and Measure Groups

Figure 2:
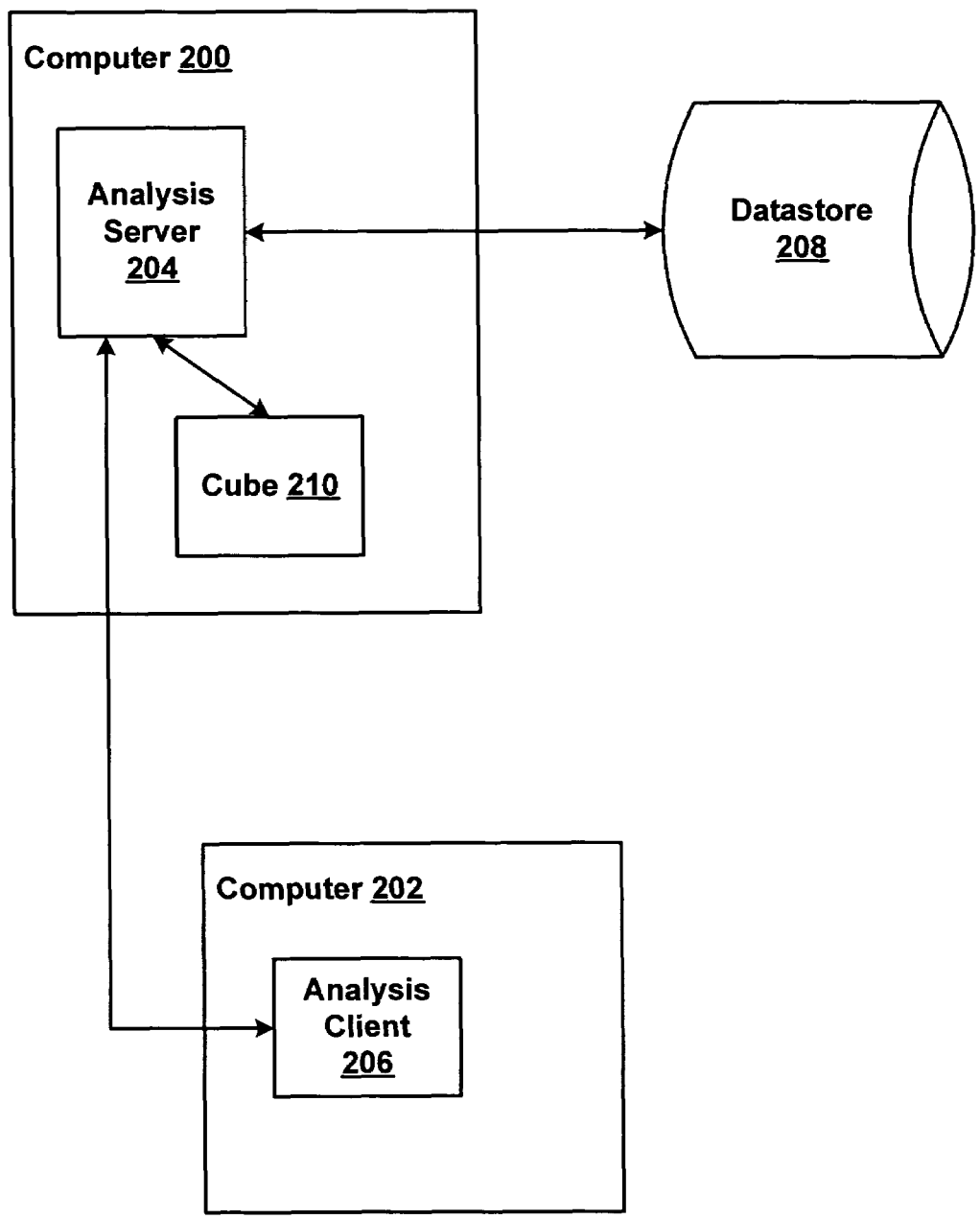
FIG. 2 illustrates an exemplary data analysis system.

A typical data analysis system is illustrated in FIG. 2. Such a system may comprise a computer 200 on which one or more instances of an analysis server 204 may run. A datastore 208 may comprise raw data from which one or more cubes such as cube 210 is generated by the analysis server 204. A data analysis client, such as analysis client 206 may run on a second computer 202. Analysis client 206 may send requests to analysis server 204 for data results from cube 210.

A system level overview of an exemplary embodiment of the invention is described with reference to FIG. 3. The invention may operate within a multiprocessing, multi-threaded virtual memory operating environment on one or more computers, each of the computers comprising a computer such as computer 110 described with respect to FIG. 1. An operating environment may include one or more of the following: one or more analysis client modules such as OLAP client 205, one or more instances of an analysis server module (e.g., OLAP server 260 running on computer 222*a*) and one or more datastores or databases (e.g., Database A 250*a*, Database B 250*b*, etc.).

Computer 222*a* may include one or more instances of analysis server 260 (e.g., an OLAP or data mining server). An analysis server 260 accumulates and transforms data and responds to user requests to view the data. An analysis server 260 may be associated with one or more datastores or databases (e.g., Database A 250*a*, Database B 250*b*, etc.).

The analysis server (e.g., OLAP Server 260) may provide analysis services to one or more client applications, such as OLAP client 205. In some embodiments of the invention, the OLAP server 260 is a version of the SQL Server Analysis Services product from MICROSOFT® Corporation, however, the invention is not limited to any particular analysis, OLAP or data mining server product, and alternatively could be Hyperion Solutions Essbase, Oracle Express, Cognos Powerplay or others.

The data maintained by OLAP server 260 may include cube metadata and cube data for one or more data cubes. Cube metadata may comprise information that defines and describes the cubes maintained by OLAP server 260. Included in the cube metadata are definitions of the dimensions (for example dimension 1 262*a*, dimension 2 262*b* and dimension 3 262*c* for cube 1 240*a* and linked dimension 1 268*a*, linked dimension 2 268*b* and dimension 4 268*d* for cube 2 240*b*) and measures that define the cubes. If more than one cube contains a given dimension, the metadata for each of the cubes containing that dimension may refer to a single data structure describing that dimension. Similarly, if more than one cube contains a given measure, the metadata for each of the cubes containing that measure may refer to a single data structure describing that measure.

OLAP server 260 may also maintain the cell values (i.e., the measure data) in the cube data for the cube defined by the metadata. For example cube 1 240*a* may include cell values associated with the defined dimensions (dimension 1 262*a*, dimension 2 262*b*, and dimension 3 262*c*) and measure groups (measure group A 264*a*). Similarly cube 2 240*b* may include cell values associated with the defined dimensions (linked dimension 1 268*a*, linked dimension 2 268*b*, and dimension 4 268*d*) and measure groups (linked measure group A 270*a* and measure group B 270*b*). In some embodiments of the invention, cube data (e.g., cube 240*a* and/or cube 240*b*) is stored in relational format on a persistent storage device such as a disk in a file or database partition that is managed directly by OLAP server 260. However, the invention is not so limited, and in an alternative embodiment, OLAP server 260 interfaces with a relational database system that maintains cube data 240*a* and/or cube data 240*b*. Examples of such databases include, but are not limed to SQL Server, Oracle, Informix, DB2, etc.

Figure 3:
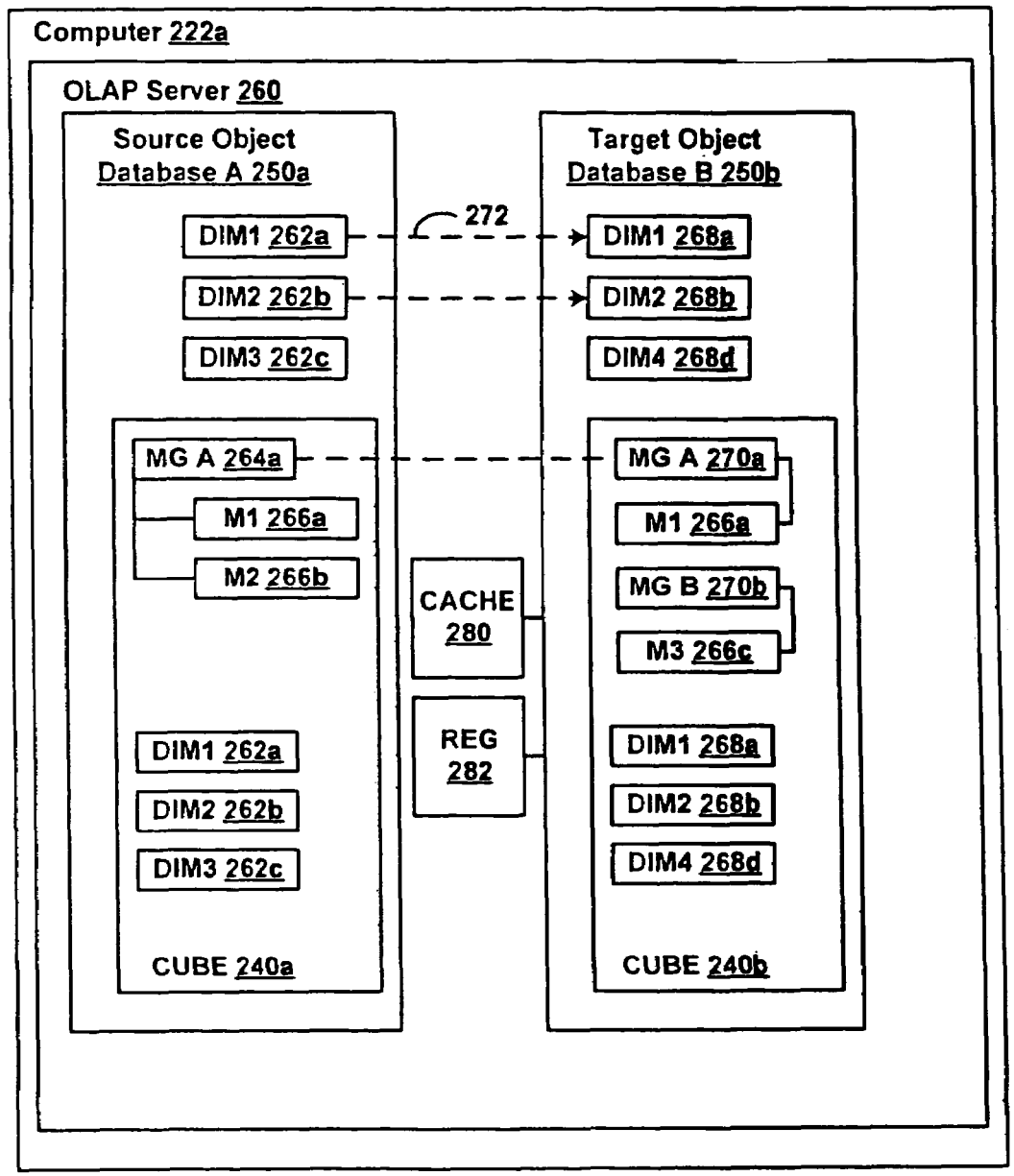
FIG. 3 illustrates an exemplary system employing linked dimensions and measure groups in accordance with one embodiment of the invention.

In FIG. 3, Database A 250*a* represents a source database and Database B 250*b* represents a target database. The term "publisher" is sometimes used to refer to a source dimension, cube, measure group, database or machine and the term "subscriber" is sometimes used to refer to a target dimension, cube, measure group, database or machine. In accordance with some embodiments, dimensions and measure group objects may be linked from one database (e.g., from database A 250*a*) to another (e.g., to database B 250*b*). The databases (e.g., databases 250*a* and 250*b*) may reside on the same computer (as shown in FIG. 2) or on different computers. The databases may reside on the same machine (computer) and be associated with the same instance of the analysis server (as shown in FIG. 2) or they may reside on the same machine and be associated with different instances of the analysis server or they may reside on different machines and be associated with different instances of the analysis server. Alternatively, measure group objects may be linked to the same database. Hence, although FIG. 2 illustrates the two databases, source and target residing on an analysis server, the invention is not so limited. For example, source database A 250*a* and target database B 250*b* may reside on separate analysis servers.

A dimension or measure group object of one database may be marked as "linked" to another database. One database may link to any subset of measures of any measure group and/or any subset of dimensions of the other database. As can be seen from FIG. 3, exemplary databases A 250*a* and B 250*b* are defined as follows. Dimension 1 262*a* of source database A 250*a* is linked (as represented by dotted line 272) to dimension 1 268*a* of target database B 250*b*. Dimension 2 262*b* of source database A 250*a* is linked to dimension 2 268*b* of target database B 250*b*. Measure group A 264*a* of source database A 250*a* including measure 1 266*a* and measure 2 266*b* is linked to measure group A 270*a* of target database B 250*b* including only measure 1 266*a*. Database B 250*b* also includes another measure group, measure group B 270*b* including measure 3 266*c*, which is not linked to database A 250*a*. Thus database B 250*b* is defined by linked dimension 1 268*a*, linked dimension 2 268*b*, linked measure group A 270*a*, but is also further defined by dimension 4 268*d* and measure group B 270*b*.

This has the effect of enabling data from one database to be integrated into a second database to which additional dimensions may be added. For example, suppose cube 1 240*a* is a cube created by the Sales department and is defined by dimension 1 262*a* (branch), dimension 2 262*b* (item) and dimension 3 262*c* (time). Suppose cube 2 240*b* is defined by the Inventory department. Cube 2 240*b* may be defined by linking from source cube 240*a* dimensions 1 262*a* and 2 262*b* to target cube dimensions 1 268*a* and 2 268*b*. These dimensions are then included into the target cube 240*b*. A new dimension, dimension 4 268*d* (manufacturer) may also be added. The Production department will be able to see and use dimension data associated with branch, item and manufacturer but will not be able to view or use time data. Any subset of source dimensions can be linked to the target cube.

FIG. 3 shows that measure group A 264*a* is linked to target cube 2 240*b*. In addition, measure group B has been defined for target cube 2 240*b*. Any subset of measures of source measure groups can be linked to the target cube.

OLAP client 205 may be one of many clients that require the services of an OLAP server such as OLAP server 260. OLAP client 205 may be for example, a data mining application, a data warehousing application, a data analysis application, a reporting application or others. OLAP client 205 typically interacts with OLAP server 260 by issuing OLAP queries. In some embodiments of the invention, queries are submitted to a query processor component of the client 205 which returns the results of the query to client 205.

When the linked object is created and processed, a connection to the data source is established and the metadata from the source object is retrieved. Subsequently, when a client issues a query to the linked object, the request is forwarded to the source object and a response is returned to the client. The response results may be cached in a cache in memory 280 and registered in a registry 282 so that subsequent identical requests do not have to be requested from the source (potentially remote) object. In some embodiments, the cache is managed using a least recently used (LRU) scheme, although other schemes such as but not limited to a scheme based on least time to build, or a scheme based on most memory usage, etc. may be used.

When the metadata or data on the source object changes, the linked object may detect the change and refresh its cache. In some embodiments of the invention, changes are detected in accordance with a RefreshPolicy property of the object. Contemplated RefreshPolicies include ByQuery, in which the data is refreshed with every query to the linked object, or ByInterval in which data is refreshed after a specified interval (e.g., hourly, daily, weekly, monthly, etc.). The interval in some embodiments is specified via a property RefreshInterval.

A LinkPersistence property may control how changes to the linked object are handled. If the LinkPersistence property is specified as "metadata", then the metadata of the object is retrieved and persisted. In this case, if the structure of the data on the publisher is changed, the changes may not be seen by the subscriber. For example, if another dimension is added to the database, the new dimension will not be seen by the subscriber. The metadata on the subscriber is not changed until the next time the object is processed or altered.

If the LinkPersistence property is specified as "data" or "fully persisted", then the metadata and data of the object are retrieved and persisted. In this case, many of the files are transferred from the publisher to the subscriber. The version of the transferred files is also persisted.

If the LinkPersistence property is specified as "not persisted", then neither metadata nor data is persisted. The object is fully dynamic and any change made to database A is propagated to the linked object. In this case, when data is requested from the publisher, a dynamic request is sent to the publisher and the publisher retrieves the data and returns it to the subscriber. The subscriber in some embodiments stores the retrieved data in a cache 280 and keeps track of the data in cache by registering the information in a registry 282. If a second request is received on the subscriber for information stored in the cache and registered in the registry, data from the cache will be returned, thus avoiding another request to the publisher for the same data. If data stored in cache on the subscriber is updated on the publisher, the change is detected, the subscriber flushes the cache and the process repeats.

A Filter property may be specified to restrict the contents of the linked object. For example, a department might link to a central products dimension but limit the products accessed to products of a certain type. It will be understood that the invention is not limited to the use of the above names for the properties, any suitable property names are contemplated.

Figure 4:
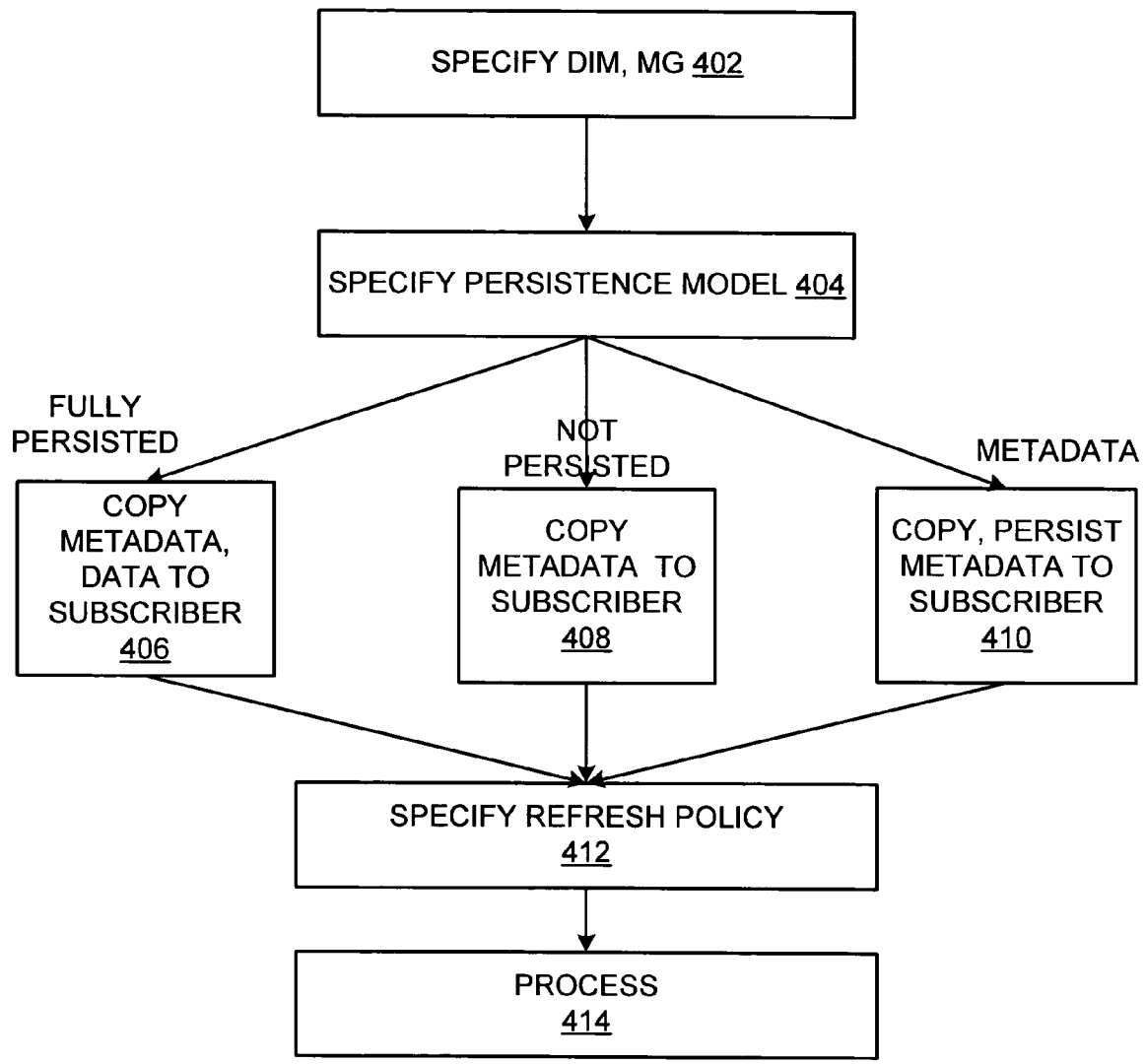
FIG. 4 is a flow diagram illustrating an exemplary method for established linked dimensions and measure groups in accordance with one embodiment of the invention.

FIG. 4 illustrates an exemplary method for creating linked dimension and measure group objects. At step 402 the set of dimensions and measure groups to link to are selected. In some embodiments, dimensions and measure groups can be specified as restricted, meaning these dimensions and measure groups can not be linked to. Additional dimensions and measure groups can be defined (for example, dimension 4 268d and measure group B 270b of FIG. 3).

At step 404 the model of persistence desired is specified. For example, the persistence model specified may be "fully persisted", "not persisted" or persist "metadata" only. If the model chosen is "fully persisted" at step 406 the metadata and data (measure groups) are copied from the publisher to the subscriber.

If the model chosen is "not persisted" at step 408 the metadata and optionally some additional structural data is copied to the subscriber from the publisher.

If the model chosen is "metadata" at step 410 metadata is copied from the publisher to the subscriber and persisted on the subscriber machine.

At step 412 a refresh policy is specified. The refresh policy specified may be ByQuery or ByInterval, as described above. At step 414 the object may be processed. When processing a query, the query processor component of the subscriber establishes a connection to the source server, and retrieves metadata from the source object. The subscriber issues a query to the linked object and forwards the request to the source object. The source object returns the response to the subscriber which caches the result in memory using the LRU data caching scheme or any other suitable caching scheme. When metadata or data on the source object changes, the linked object detects the change and refreshes the content according to the refresh policy.

Systems and methods of the invention as described herein may be embodied in the form of computer-implemented processes and system for practicing those processes. They may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by a computer, the computer becomes a system for practicing the invention. The systems and methods of the invention may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes a system for practicing the invention. When implemented on a general-purpose processor, the computer program code segments configure the processor to create specific logic circuits.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While embodiments of the present invention have been described in connection with the exemplary embodiments of the various figures, it is to be understood that other similar embodiments may be used or modifications and additions may be made to the described embodiments for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed:

1. A method of sharing database objects between a source datastore and a target datastore, the method comprising the following steps:

linking at least one object in the source datastore to an object in the target datastore;

specifying a persistence property of the linked source object for controlling how changes to the linked source object are handled by the target datastore, wherein the persistence property is selected from persisting only metadata in the target datastore such that metadata is copied from the source datastore to the target datastore and changes to metadata of the linked source object are not updated in the target datastore until object data of the linked source object is altered, persisting both metadata and object data changes of the linked source object in the target datastore such that the metadata and the object data are copied from the source datastore to the target datastore and changes to metadata of the linked source object are not updated in the target datastore until object data of the linked source object is altered, and persisting neither metadata nor object data in the target datastore such that any change made to the linked source object is propagated to the target datastore;

specifying a refresh policy for refreshing information in the target datastore, the refresh policy comprising one of refreshing the information in the target datastore with every query to the linked source object and refreshing the information in the target datastore at specified time intervals;

specifying at least one restricted object in the source datastore as unlinkable to an object in the target datastore;

integrating data from the object in the source datastore to the target datastore; and processing a query to the linked source object by forwarding the query to the object in the source datastore, receiving a response to the query, caching the response in a memory, and registering the response in a registry.

2. The method of claim 1, further comprising the step of selecting at least one group of measures in the source datastore as the linked source object.

3. The method of claim 1, wherein the source datastore and the target datastore are analysis databases.

4. The method of claim 3, wherein the source datastore and the target datastore are OLAP databases.

5. The method of claim 1, further comprising the step of specifying a filter for the target datastore.

6. The method of claim 5, wherein the filter limits data accessible by the target datastore to data of a specified type.

7. The method of claim 1, wherein the linked source object is a dimension in the target datastore.

8. The method of claim 1, wherein the linked source object is a measure group in the target datastore.

9. A system for sharing data between a source database and a target database, the system comprising:
   a processor;
   a memory; and
   a module for linking at least one object in the target database to an object in the source database, the module including a persistence property of the linked source object for the target database for controlling how changes to the linked source object are handled by the target database, wherein the persistence property is selected from persisting only metadata in the target database such that metadata is copied from the source database to the target database and changes to metadata of the linked source object in the source database are not updated in the target database until the object data of the linked source object is altered, persisting both metadata and object data changes of the linked source object in the target database such that the metadata and the object data are copied from the source database to the target database and changes to metadata of the linked source object are not updated in the target database until object data of the linked source object is altered, and persisting neither metadata nor data in the target database such that any change made to the linked source object in the source database is propagated to the target database,
   the module specifying a refresh policy for refreshing information in the target database, the refresh policy comprising one of refreshing the information in the target database with every query to the linked source object and refreshing the information in the target database at specified time intervals,
   the module specifying at least one restricted object in the source database as unlinkable to an object in the target datastore,
   the module integrating data from the object in the source database to the target database,
   the module processing a query to the linked source object by forwarding the query to the object in the source database, receiving a response to the query, caching the response in the memory, and registering the response in a registry, wherein caching the response is managed using a least recently used (LRU) scheme.

10. The system of claim 9, wherein the linked source object is a dimension in the target database.

11. The system of claim 9, wherein the object is a measure group in the target database.

12. The system of claim 9, further comprising an analysis module for specifying the dimensions in the source database and the target database to be linked.

13. The system of claim 9, further comprising an analysis module for specifying the measure groups in the source database and the target database to be linked.

14. The system of claim 9, wherein the source database resides on a first computer and the target database resides on a second computer.

15. The system of claim 9, wherein the source database is associated with a first instance of an analysis module and the target database is associated with a second instance of an analysis module.

16. A computer-readable storage medium comprising computer-executable instructions for:
    linking an object in a source analysis datastore to an object in a target analysis datastore;
    selecting a persistence property of the linked source object for controlling how changes to the linked source object are handled by the target analysis datastore, the persistence property further is selected from persisting only metadata in the target analysis datastore such that metadata is copied from the source analysis datastore to the target analysis datastore and changes to metadata of the linked source object are not updated in the target analysis datastore until object data of the linked source object is altered, persisting both metadata and object data changes of the linked source object in the target analysis datastore such that the metadata and object data are copied from the source analysis datastore to the target analysis datastore and changes to metadata of the linked source object are not updated in the target analysis datastore until object data of the linked source object is altered, and persisting neither metadata nor data in the target analysis datastore such that any change made to the linked source object in the source datastore is propagated to the target analysis datastore;
    selecting a refresh policy for refreshing information in the target analysis datastore, the refresh policy comprising one of refreshing the information in the target analysis datastore with every query to the linked source object and refreshing the information in the target analysis datastore at specified time intervals;
    specifying at least one restricted object in the source analysis datastore as unlinkable to an object in the target datastore;
    integrating data from the linked object in the source analysis datastore to the object in the target analysis datastore; and
    processing a query to the linked source object by forwarding the query to the object in the source analysis datastore, receiving a response to the query, caching the response in a memory, and registering the response in a registry.

* * * * *